United States Patent
Ellison et al.

(10) Patent No.: US 7,115,679 B2
(45) Date of Patent: Oct. 3, 2006

(54) WIDE-GAP FILLER MATERIAL

(75) Inventors: Keith Ellison, Burlington (CA); Joseph Liburdi, Dundas (CA)

(73) Assignee: Liburdi Engineering Ltd., Ontario (CA)

( * ) Notice: Subject to any disclaimer, the term of this patent is extended or adjusted under 35 U.S.C. 154(b) by 255 days.

(21) Appl. No.: 10/886,728

(22) Filed: Jul. 9, 2004

(65) Prior Publication Data

US 2004/0238071 A1 Dec. 2, 2004

Related U.S. Application Data

(62) Division of application No. 10/419,816, filed on Apr. 22, 2003, now Pat. No. 6,797,759, which is a division of application No. 08/660,200, filed on Jun. 3, 1996, now Pat. No. 6,624,225.

(51) Int. Cl.
*A01G 9/24* (2006.01)
*C08K 3/08* (2006.01)
*C08K 3/22* (2006.01)
*C08K 3/10* (2006.01)
*C08F 236/12* (2006.01)

(52) U.S. Cl. .................. 524/439; 524/434; 524/435; 524/436; 524/440; 524/292; 524/297

(58) Field of Classification Search ............... 524/439, 524/440, 434, 435, 436
See application file for complete search history.

(56) References Cited

U.S. PATENT DOCUMENTS

| | | | |
|---|---|---|---|
| 2,566,339 A | 9/1951 | Klinker | |
| 2,582,993 A | 1/1952 | Howatt | |
| 2,594,313 A | 4/1952 | Klinker | |
| 2,606,132 A | 8/1952 | Klinker | |
| 2,908,072 A | 10/1959 | Johnson | |
| 3,073,270 A | 1/1963 | Johnson et al. | |
| 3,293,072 A | 12/1966 | Doolittle et al. | |
| 3,309,239 A | 3/1967 | Harris | |
| 3,589,952 A | 6/1971 | Burne | |
| 4,073,639 A | 2/1978 | Duvall et al. | |
| 4,076,899 A | 2/1978 | Kring | |
| 4,381,944 A | 5/1983 | Smith, Jr. et al. | |
| 4,475,959 A | 10/1984 | Liang et al. | |
| 4,507,421 A | 3/1985 | Symietz | |
| 4,557,857 A | 12/1985 | Sorensen | |
| 4,729,914 A | 3/1988 | Kliment et al. | |
| 4,855,002 A | 8/1989 | Dunn et al. | |
| 4,921,755 A | 5/1990 | Carroll, Jr. et al. | |
| 4,994,207 A | 2/1991 | Edelman et al. | |
| 5,156,321 A | 10/1992 | Liburdi et al. | |
| 5,159,007 A | 10/1992 | Saitoh et al. | |
| 5,162,087 A | 11/1992 | Fukuzawa et al. | |
| 5,252,422 A | 10/1993 | Okano et al. | |
| 5,270,364 A | 12/1993 | Schwartz et al. | |
| 5,416,156 A | 5/1995 | Kamen | |
| 5,443,658 A | 8/1995 | Hermanek | |
| 5,561,827 A | 10/1996 | Reeves et al. | |
| 5,626,988 A | 5/1997 | Daniel-Ivad et al. | |
| 5,952,042 A * | 9/1999 | Rafferty et al. | ............. 427/189 |
| 6,612,480 B1 * | 9/2003 | Rafferty | ............. 228/119 |

FOREIGN PATENT DOCUMENTS

| | | |
|---|---|---|
| DE | 4131 871 C1 | 9/1991 |
| EP | 03 53 84 3 A | 7/1990 |
| FR | 2 193 676 A | 7/1973 |

OTHER PUBLICATIONS

Remanufactured Pump Impeller Lasts Twice As Long As New One, Welding Journal, Apr. 1971.
R.M. German, "Powder Injection Molding", Metal Powder Industries Federation, Princeton, N.J., 1990, pp. 99-124.
International Search Report Dated Jul. 27, 1998.
Polymer Handbook 2$^{nd}$ Edition 1975 p. 111-146.

* cited by examiner

*Primary Examiner*—Duane Smith
*Assistant Examiner*—Ives Wu
(74) *Attorney, Agent, or Firm*—Smith, Gambrell & Russell, LLP

(57) ABSTRACT

This invention relates to a composition for repairing metallic articles which in its initial state is in the form of an adhesive, self-supporting putty, capable of being molded including 5–15% by weight of a sacrificial binder containing at least one acrylic resin and volatile solvent. The invention also relates to a kit for the composition and methods for repair.

4 Claims, No Drawings

WIDE-GAP FILLER MATERIAL

CROSS REFERENCE TO RELATED APPLICATION

This application is a division of Ser. No. 10/419,816, filed Apr. 22, 2003, now U.S. Pat. No. 6,797,759 which is a division of Ser. No. 08/660,200, filed Jun. 3, 1996, now U.S. Pat. No. 6,624,225, which is being incorporated in their entirety herein by reference.

FIELD OF THE INVENTION

This invention relates to the brazing or sintering of particulate materials and, more specifically, to the materials used for wide-gap joining, repair or surface coating of gas turbine components.

BACKGROUND OF THE INVENTION

Gas turbine components, such as superalloy blades and vanes, are subjected to high temperatures and stresses during engine operation. Under such conditions they will often become physically damaged due to the formation of cracks, voids and worn surfaces. When the damage extends beyond certain allowable limits, a decision must be made to either repair or replace the components. Because they are expensive to manufacture, there is considerable economic incentive to attempt repair of turbine components by methods such as welding, brazing or wide-gap brazing.

Wide-gap brazing refers to the repair of defects too large to be filled or bridged by standard brazing techniques wherein the gap filler material is drawn into defects by capillary forces alone. Therefore, wide-gap filler materials must to be physically pre-placed within joints or defects or onto surfaces and, during heat treatment, exhibit sluggish flow which prevents them from substantially flowing out of the repair area. Prior art wide-gap filler compositions are typically comprised of a mixture of superalloy and braze alloy powders suspended in some type of temporary organic vehicle so as to form a slurry, paste or transfer tape. The organic vehicle, or binder, is usually comprised of an organic polymer dissolved in a solvent, and sometimes includes a plasticizer and dispersant. The organic polymer provides strength to the alloy powder deposit after the solvent has evaporated, bonding the powder particles to each other, as well as to the substrate article. (The word "binder" is usually used to mean all of the ingredients present in the vehicle, including the organic polymer, solvent, plasticizer, wetting agent, etc. However, in many references, the word "binder" refers specifically to the organic polymer constituent of the vehicle. When used herein, the word "binder" shall be used in the traditional sense and the phrase "principle binder resin" shall be used to refer to the organic polymer component.) Subsequent drying and furnace heat treatment operations decompose and vaporize the various binder constituents, followed by brazing or sintering of the powder. Alloy powders used for wide-gap filler materials are described in U.S. Pat. Nos. 4,073,639 and 4,381,944. Organic binders and methods used in the formulation of slurries, pastes and transfer tapes have been described in U.S. Pat. Nos. 2,908,072; 3,293,072 and 3,589,952.

Historically, wide-gap repairs were developed for the repair of defects in aero or aeroderivative gas turbine components. Relatively speaking, these components and the defects in them tend to be small. For example, a typical wide-gap crack in an aero gas turbine component might be about ¼ inch in length by about 0.030 inches in width or depth. In contrast, heavy frame gas turbines which are designed primarily for industrial power generation are much larger than aero or aeroderivative gas turbines. A single vane segment or blade from one of these engines can weigh upwards of 100 lbs. Crack defects in these components are correspondingly much larger, with dimensions often exceeding several inches in length and up to one inch in width or depth. Standard welding techniques cannot always be used to successfully repair this type of damage, and it is again desirable to be able to use some type of wide-gap repair process for component restoration.

While the wide-gap slurries, pastes and transfer tapes of the prior art have been found useful for the repair or joining of the smaller areo components, there are many situations in which these materials are unsatisfactory for the repair of larger defects in heavy frame gas turbine components. For instance, it is often desirable to be able to apply the wide-gap filler material to thicknesses of ⅛ inch or more onto surfaces with vertical or inverted orientations. After it is applied, the filler material should neither flow, shrink, nor form defects such as voids, tears and the like during subsequent handling and heat treatments. Prior art wide-gap repair materials will either slump or fall off the article during drying and/or heat treatment when used in this way, making it necessary to complete the brazing or liquid phase sintering operation in a number of steps by varying the orientation of the article in the furnace each time.

Some additional requirements of a good wide-gap filler material are that, during its initial application, it should be capable of plastic flow together with adhesive properties which are similar to those of a modelling clay. These properties would allow the alloy powder mixture to flow into a desired shape by applying a moderate force, for example by hand, and thereafter keep its shape, while adhering to the substrate article in various orientations. Once the external force is removed from the wide-gap filler, it should keep its shape while the repair article is handled, stored, dried, and heat treated. These attributes are not found in the wide-gap slurries, pastes and transfer tapes of the prior art. For example, a powder metallurgy repair material, comprised of a mixture of iron-base alloy powders and a plastic binder, has been described in connection with the repair of centrifugal pump impellers (Welding Journal, April 1971, pp. 255–256). The proprietary materials used in this method were molded by hand, however, back-up supports were needed on the underside of through-going defects to hold the powder mix in place. In other words, the mixture was not self-supporting.

Still another limitation of prior art wide-gap filler materials has been encountered in the repair of hollow gas turbine components which contain through-going defects or details. In most cases, drop-through or flow of the repair filler material into interior cooling passages or cavities cannot be tolerated, since obstruction of these passages would render the component unserviceable and unrepairable due to the limited access afforded by the component design. It is very difficult to control the flow of prior art wide-gap pastes and slurries which makes them unsuited to the repair of these types of defects or details. An important advantage of the wide-gap filler material of the present invention is that the aforementioned limitations related to molding, flow, slumping and loss of adhesion can be eliminated. This advantage is realized through the use of the novel sacrificial binder system of the present invention.

Finally, within the general category of materials comprised of metal powder alloys and organic binders there exists another class of materials which are used in the powder injection molding art. Powder injection molding (herein referred to as PIM) is a method for the fabrication of ceramic or metallic sintered parts. A solid green body or compact comprised of a ceramic or metallic particulate material and a sacrificial binder mixture is molded in a die by the application of heat and mechanical pressure in an injection molding machine. The binder ingredients are later removed from the green body in a series of solvent or thermal debinding processes, followed by firing and sintering of the compact. The main PIM binder types are thermoplastic, thermosetting and gelation systems (R. M. German, *Powder Injection Molding*, Metal Powder Industries Federation, Princeton, N.J., 1990, pp. 99–124). Thermoplastic sacrificial binders used in the formulation of PIM feedstock are rigid and non-adhesive at room temperature and must be softened by heating before the mixture will flow adequately to allow mold filling. Thermosetting and water-based gelation binders develop their strength by cross-linking of the polymer units at elevated temperatures. Rigid, self-supporting compacts can only be produced from these materials by heating the die cavity after the feedstock has been introduced. The need for substantial temperature and pressure variations during the processing of PIM feedstocks makes the binders used in these formulations unsuitable for use in conjunction with the wide-gap filler materials of the present invention.

SUMMARY OF THE INVENTION

One object of the present invention is to provide an improved wide-gap filler material, useful for the manufacturing, joining or repair of metallic articles which will allow the positioning and heat treatment of thick (e.g. ⅛ inch), complex, near-net-shape powder alloy deposits in horizontal, vertical or inverted orientations without the need for surrounding back-up dams or support materials.

Another object is to provide a wide-gap filler material which, in its initial form, will remain soft, moldable, self-supporting and adhesive (tacky), even after being exposed to air at room temperature over a period of several hours.

Still another object is to provide a wide-gap filler material which will not slump, shrink, crack or flow away from its initial position during subsequent handling or vacuum heat treatment operations, even when it is positioned in vertical or inverted orientations.

A further object is to provide a wide-gap filler material which can be used to fill through-going defects in hollow components where there is limited or no access to the interior cavity. The improved wide-gap filler material of the present invention will not slump or drop through into the interior cavities of the component during application or processing.

These and other objects and advantages will be more fully understood from the following detailed description of the preferred embodiments, which are intended to be typical of, rather than in any way limiting on, the scope of the present invention.

Briefly, in one form of the present invention there is provided an improved sacrificial binder mixture consisting essentially of, by weight, 31–33% acrylic resin, having a glass transition temperature ($T_g$) less than 20° C., 22–24% phthalate or adipate-type plasticizer, 42–44% glycol ether or glycol ether acetate with a vapor pressure of less than 20 mm Hg at 25° C. and 1–2% nonyl phenol base or octyl phenol base nonionic surfactant as a wetting agent. The binder mixture is combined with a finely divided alloy powder or blend of powders to give a composition consisting of, by weight, 5–8% of the binder mixture and 92–95% of the alloy powder or powders. The resulting filler material is in the form of an adhesive, self-supporting, moldable putty, capable of being forced under manually applied pressure to bond with, and take the shape of, a joint or repair cavity in any orientation.

In another form of the present invention, there is provided a two-part (Part A and Part B) wide-gap filler material comprised of two powdered alloys, provided as separate components, each in the form of a moldable, adhesive putty. The first component (Part A) putty comprises a metal alloy powder having as its basis metal an element selected from the group consisting of nickel, cobalt or iron. The first component putty may, in addition, contain a certain amount of a non-metallic (e.g. oxide, nitride or carbide) particulate material. The second metallic alloy powder has a liquidus temperature lower than the solidus temperature of the first component particulate material(s) and the substrate article. The ratio of these two putty components, Part A (containing the first alloy powder(s) plus binder mixture): Part B (containing the second alloy powder plus binder mixture), is controlled to be in the range from 4:1 to 1:1, depending on the properties required in the final repair deposit and the processing characteristics of the alloy powders when they are used to repair or join the metal articles.

The invention in still another form provides a method for using the putty containing the improved sacrificial binder of the present invention to manufacture or repair a metallic article. After preparation and cleaning of the bonding or mating surfaces, a single or two-part alloy putty is applied to the article and shaped or molded to produce a near-net-shape build-up. The sacrificial binder ingredients are then removed in a controlled thermal process to prevent flow, slumping, or separation of the repair deposits from the article. The sacrificial binder ingredients are additionally removed by methods which allow vapors and gaseous decomposition products to escape from the wide-gap filler material without causing internal pressure build-ups which could otherwise lead to the formation of defects such as voids, blisters, cracks, tears and the like.

This application also relates to a kit for the composition and method for repair.

DESCRIPTION OF A PREFERRED EMBODIMENT

In the repair or joining of metallic articles using wide-gap filler materials in accordance with the present invention, defects within worn articles are first removed by mechanical means or the surfaces of the joint are brought into position with one another. A particulate filler alloy is blended with a sacrificial binder to form the wide-gap filler and is then placed within the repair cavity or between the joint surfaces. Portions of the sacrificial binder are removed by drying the article in air at temperatures up to 200° C. and then the article is placed into a vacuum furnace to be brazed or liquid phase sintered. During the overall brazing or liquid phase sintering process, the article is first held at an intermediate temperature which causes the remainder of the sacrificial binder ingredients to decompose into gaseous products and be removed by evaporation. The temperature is then raised to a point at which the wide-gap material melts, re-solidifies and fuses with the parent metal of the article forming a sound, high strength joint.

The sacrificial binder system of the present invention comprises at least a principle binder resin which is a thermoplastic and has a softening or glass transition temperature ($T_g$) below about 20° C., and a solvent with a low vapor pressure, preferably less than about 20 mm Hg at 25° C. Additionally, the sacrificial binder system of the present invention may contain a plasticiser and a wetting agent. The low glass transition temperature of the principle binder resin makes it soft and malleable at room temperature, while the low vaporization rate of the solvent contributes to wet tack, adhesion and a useful working life. When combined with alloy powders, these binder properties result in a wide-gap filler material with a consistency somewhat like modelling clay or adhesive putty.

The principle binder resin preferably comprises an acrylic polymer or blend of acrylic polymers which provide a balance of cohesive strength or rigidity and softness or flexibility. For example, a tough, hard resin which has good strength and a high softening temperature can be plasticized with a softer, more flexible resin to give the desired properties. If the glass transition temperature of the principle binder resin is low enough, it may even have a slight tacky feel even before solvents and plasticizers are added. Acrylic resins have other desirable properties which make them useful as ingredients in the sacrificial binder system of the present invention. For example, acrylic resins remain stable above their softening range at temperatures up to 170–230° C. This property allows the selective removal of the solvent portion of the binder to take place by evaporation in air at temperatures up to 150° C., prior to vacuum furnace heat treatment. At higher temperatures (i.e. above 260° C.), acrylics depolymerize to volatile monomers, leaving negligible ash or solid residue in the repair deposits. Some examples of acrylic resins which are used in conjunction with the present invention are methacrylate, methyl methacrylate, ethyl methacrylate, n-butyl methacrylate, isobutyl methacrylate, methyl/n-butyl methacrylate, n-butyl/isobutyl methacrylate, methyl/laurel methacrylate polymers and copolymers. It is preferred that the principle binder resin make up 25–50% by weight of the sacrificial binder system and most preferably 30–40% of the sacrificial binder system.

The solvent used in conjunction with the sacrificial binder of the present invention must be active, which is to say that it is capable of dissolving the principle binder resin. Initially, the solvent contributes to the wet tackiness, softness, and moldability of the sacrificial binder system. After the wide-gap filler material has been applied to an article to be repaired or joined, the principle binder resin is dried and hardened by evaporation of the solvent. Thus, the solvent must have a low volatility at room temperature in order to provide a useful working life (e.g. several hours) once it is exposed to the atmosphere, but substantially vaporize when heated to temperatures up to 200° C. When used in conjunction with the sacrificial binder of the present invention, it is desirable that the solvent have a vapor pressure below 20 mm Hg at ambient temperature and most preferable that the vapor pressure be below 1 mm Hg at ambient temperature. The solvent must vaporize completely and cleanly during air drying and vacuum furnace burn-out. Additionally, it is desirable that the solvent pose a low health risk during handling and drying. Solvents which are compatible with the sacrificial binder system of the present invention are esters such as isoamyl acetate and isobutyl acetate, hydrocarbons, such as VM&P naptha and mineral spirits and glycol ethers and acetates such as propylene glycol methyl ether, dipropylene glycol methyl ether, tripropylene glycol methyl ether, propylene glycol methyl ether acetate and dipropylene glycol methyl ether acetate. The glycol ethers and acetates and hydrocarbons are most preferred in the present invention since they pose the lowest health risks and meet the most preferred volatility criteria listed above. It is preferred that the solvent make up 25–60% by weight and most preferably 30–45% of the sacrificial binder system.

In addition to the principle binder resin and solvent, the sacrificial binder system of the present invention may optionally contain a plasticizer. The plasticizer further lowers the softening temperature of the principle binder resin and provides added flexibility, softness and adhesion. The plasticizer must be chemically compatible (i.e. form solutions) with the principle binder resin and solvent, sufficiently volatile to allow its removal during the vacuum furnace binder burn-out process, but not sufficiently volatile to be substantially removed during mixing, storage, molding or air drying. The plasticizer must further completely decompose into gaseous, volatile species at high temperatures without leaving substantial level of solid residue. Plasticizers which have been found to be useful in the present invention and which have the above desirable properties include phthalic and adipic esters. Some examples of phthalic esters which can be used to plasticize the acrylic principle binder resins are alkyl benzyl phthalate, butyl benzyl phthalate, butyl octyl phthalate, dibutyl phthalate, dicyclohexyl phthalate, diethylphthalate, dihexyl phthalate, diisodecyl phthalate, di-2-methoxyethyl phthalate, dimethyl phthalate, ditridecyl phthalate, di-2-ethylhexyl phthalate, diisooctyl and mixed octyl phthalate, n-octyl n-decyl phthalate and isooctyl isodecyl phthalate. Some examples of adipic esters which can be used to plasticize acrylic resins are dioctyl adipate. diisodecyl adipate, di-2-ethylhexyl adipate, octyl decyl adipate, diisobutyl adipate and diisooctyl adipate. It is preferred that the plasticizer make up 0–30% by weight and most preferably 15–25% of the sacrificial binder system.

Finally, the sacrificial binder resin of the present invention may, optionally, contain a wetting agent. The wetting agent lowers the surface tension of the binder system, promoting adhesion to the repair cavity or joint surfaces and dispersion of powder particles. The wetting agent must also be compatible with the other binder ingredients and burn out cleanly from the filler material leaving negligible ash or solid deposits. Wetting agents which have been found to be useful in conjunction with the binder system of the present invention are nonyl or octyl phenol base nonionic surfactants. Some examples of nonyl phenol based surfactants are nonylphenol polyethylene glycol ether and nonylphenoxypolyethoxyethanol nonionic surfactant. An example of an octyl phenol base surfactant is octylphenoxypolyethoxyethanol nonionic surfactant. It is preferred that the wetting agent make up 0–5% by weight of the sacrificial binder system and most preferably 1–2% of the sacrificial binder system.

The metallic particulate filler alloy used in conjunction with the sacrificial binder of the present invention can be of any composition or blend of powders which may be required to produce satisfactory repair joints, as required by the application. Spherical or at least regularly-shaped particles are preferred since they form smoother, more uniform putty mixtures. Irregular or agglomerated powder particles require larger amounts of binder and do not form smooth, homogeneous mixtures. In a preferred form of the present invention, the particulate material will pass through a −325 mesh standard sieve. Particles which are substantially coarser than −325 mesh size result in putty mixtures which have a granular texture and do not flow as smoothly to fill repair cavities. A fine particle size also promotes sintering and solid-state bonding of the filler powder to adjacent surfaces during removal of the last binder components in the vacuum furnace.

In preparing the moldable, self-supporting wide-gap filler materials of the present invention, it is essential that the ratio of the sacrificial binder to the particulate alloy be controlled to produce the desired properties. If too little of the sacrificial binder is used, the repair filler material will have a granular texture, lacking sufficient cohesive and adhesive strength to be properly shaped and molded. If an excess of binder is used, a number of problems may be encountered including slumping of the repair deposit during handling, drying or heat treatment due to particle settling and migration, distortion during binder removal and sintering, separation of the binder from the particulate constituent, leading to nonhomogeneities in the applied filler material. The most preferred sacrificial binder/powder composition of the present invention corresponds to that in which there is just enough binder present to fill the interstitial spaces between the alloy powder particles. At this composition, which is known as the critical loading point, the alloy powder particles are in an optimal packing arrangement which results in point-to-point contact between adjacent particles. This is also the composition at which the putty attains the highest viscosity and resistance to flow or deformation. The critical loading composition thus attains the greatest gravitational and dimensional stability, thereby preventing shrinkage and slumping of the filler material after it is applied. The critical loading composition can be estimated using theoretical models which are based on the characteristics of the particulate material, but can also be identified using simple tests derived from paint technology. Essentially, the sacrificial binder is added incrementally to the particulate material and mixed by hand until the mixture looses its granular texture and can be spatulated into a stiff, but coherent paste.

The preferred ratio of the sacrificial binder to particulate material in conjunction with the moldable wide-gap filler material of the present invention therefore corresponds to that of the critical loading composition. Expressed in terms of weight percentages, the critical loading composition typically corresponds to 5 to 8% of the binder of the present invention. Finally, it is noted that the optimal or preferred loading compositions of prior art brazing slurries, pastes or feedstocks used for powder injection molding are substantially different than the critical loading composition. The optimal compositions for these latter materials correspond to the case where binder loading exceeds the critical level in order to allow the powder particles to settle and compact, as in the case of a slurry, extrude through a syringe, as in the case of a brazing paste, or flow into a die, as in the case of powder injection molding.

In preparing the wide-gap filler materials of the present invention, it has been found to be particularly advantageous to premix and dissolve the sacrificial binder ingredients, followed by the addition and mixing of the particulate alloy. Premixing the binder ingredients results in rapid and complete dissolution of the principle binder resin, solvent, plasticizer and wetting agent. The latter process can be accomplished using a high speed (4,000 to 10,000 rpm) impeller mixer. Mixing and dispersion of the particulate material with the sacrificial binder is preferably accomplished at slower speeds (25–70 rpm) in a vacuum shear mixer. Vacuum mixing is considered to be essential to prevent the entrapment of air within the filler material which could lead to voids in the finished repair deposits.

After the sacrificial binder and powder have been thoroughly mixed and vacuum degassed, the resulting moldable wide-gap filler putty is ready to be discharged, packaged or used directly for repair or joining purposes. Due to the high viscosity of the putty it will not flow freely and must be removed from the mixing container either by scraping with a spatula or by pump. Since manual scraping or scooping is laborious, time consuming and presents the risk of re-introducing air pockets into the mixture, the preferred method of removing or discharging the putty from the mixer is by mechanical pump. For such highly viscous materials, a ram/follower plate discharge system is required. In this process a flat plate is forced downwards into the vessel containing the mixed putty compound using a hydraulic press. The putty flows out through an opening in top of the follower plate, from which it may be directly dispensed into holding containers or packages until needed for production purposes. Alternatively, the putty being discharged from the follower plate can be directed to a transfer pump and/or a piston metering system in those cases where repeatable, controlled amounts of the material are to be used, or where a controlled ratio of ingredients is required for a specific purpose. When the material is to be applied in variable quantities, as would be typical of the case where the repair of service-exposed gas turbine components is to be accomplished, it is preferred that the putty be provided on flat sheets or trays. Transfer pumps and metering systems are more suited to higher volume, production line assembly or Fabrication operations.

In preferred embodiment of the present invention, the moldable wide-gap filler material is provided in the form of a two-component compound, supplied and packaged as a kit with dual beads of putty in a holding tray, or dispensed directly from a dual barrel cartridge. The first component (Part A) has a composition substantially equivalent to that of the basis alloy of the article to be repaired or joined, while the second component (Part B) has a liquidus temperature below the melting range of the first component. Alternatively, the first alloy may have a composition different from the basis alloy of the article to be repaired in order to provide specific engineering qualities (i.e. strength, wear or abrasion resistance). This two-component material is intended for use in conjunction with the wide-gap powder metallurgy repair method of U.S. Pat. No. 5,156,321. In this process, Part A of the wide-gap filler material is positioned within the repair area or joint and Part B is applied onto the surface of the Part A putty, followed by heating of the article to remove the sacrificial binder and to effect partial solid state sintering and liquid phase sintering of the particulate material. The volume ratio of the Part A and B components is advantageously controlled by simultaneously dispensing side-by-side beads of the first and second component putties from a dual discharge cartridge with a fixed discharge ratio. If they are not to be used immediately, the dual beads may be stored in a temporary holding tray. During application of the repair material, this fixed ratio of A to B is maintained by using equal lengths of the two putty beads. This method eliminates the need to weigh or measure the volume of each repair deposit as it is being applied to the component.

The moldable wide-gap filler material of the present invention can be manually applied to irregular or complex-shapes using hand tools or simply by applying finger pressure and working the putty into a repair cavity or joint. Care is taken to eliminate any voids or areas of non-contact between the filler and the joint surfaces which could lead to defects in the article after thermal processing. The surface of the wide-gap filler material is molded into a desirable near-net-shape which substantially corresponds to the original surface contours of the article, thereby reducing the amount of time required to blend and finish the surface of the joint after heat treatment.

After it is applied, the wide-gap filler material is dried in an air oven in order to remove the solvent component of the sacrificial binder. This process ultimately hardens the filler deposit and renders it porous so that the remainder of the binder system can be removed in a subsequent vacuum heat treatment operation without causing internal pressure build-up or defect formation due to entrapped vapors. When raising the temperature of the article in an air drying oven, it is critical that the rate of heating and solvent removal be controlled to avoid distortion, slumping or the formation of gas porosity within the putty deposit. An exemplary drying cycle of the present invention involves raising the temperature of the air drying oven to 75° C. at a rate of 5 to 10° C. per minute. After holding at this temperature for four hours, the temperature is raised at the same rate to 150° C. and held for another four hours.

Once the filler deposits have been dried, the remainder of the sacrificial binder ingredients are removed by thermal decomposition and vaporization in a vacuum brazing or sintering furnace. Complete vaporization and elimination of the last binder ingredients of the present invention usually occurs at temperatures below 500° C. After this exposure, all solid organic residues are substantially eliminated from the repair joint, leaving only the metallic alloy powder materials which are then melted and fused or sintered by further increases in temperature.

The binder of the present invention may also be used as an adhesive for the placement and bonding of powder alloy tapes. In many repair or manufacturing applications, it is a requirement that these tapes be applied in vertical and inverted orientations. The braze paste binders of the prior art have been used for this purpose but are not capable of holding thick tape deposits in these orientations. The binder of the present invention can be applied by brushing or spray to the bonding surface of the tape or substrate article and used as an effective glue to overcome these prior limitations.

In another embodiment, the particulate component of the wide-gap filler material of the present invention may be a blend of alloy powders comprised of a mixture of metallic powder and hard particles useful for creating hard, wear or abrasion resistant layers. The hard particles may be metal nitrides, oxides, carbides, borides, or mixtures thereof. Such wear and abrasion resistant layers (hardfacing) can be applied to the surface of cold-working or hot-working tools to extend their lifetimes in service. There are many applications for this type of hard coating in the gas turbine field, on areas such as airfoil shroud faces, fuel nozzles, seal surfaces and the like.

The following examples are illustrative of the invention.

EXAMPLE 1

The combination of sacrificial binder ingredients shown in Table I were mixed together using a high speed impeller mixer for 5 minutes at 5000 rpm. A filler alloy powder was then added to the binder ingredients and mixed for an additional 10 minutes at 2500 rpm. The mixture was then transferred to shallow trays where the most volatile solvents (toluene and methyl ethyl ketone) were allowed to evaporate for 48 hours.

TABLE I

| | % WGT |
|---|---|
| Methacrylate Polymer ($T_g$ = 5° C., supplied as 40% solids in toluene) | 2.70 |
| Ethyl Methacrylate Copolymer ($T_g$ = 40° C., supplied as 30% solids in methyl ethyl ketone) | 1.05 |
| Butyl Benzyl Phthalate | 1.02 |
| Dipropylene Glycol Methyl Ether Acetate | 2.16 |
| Octylphenoxypolyethoxyethanol Nonionic Surfactant | 0.07 |
| Repair Filler Alloy Powder (−325 mesh) | 93.00 |

The resulting filler compound was in the form of a moldable, adhesive and self-supporting putty. This material was bonded to clean metal articles in vertical and inverted orientations without visibly slumping or separating after periods of up to 24 hours at room temperature.

EXAMPLE 2

The sacrificial binder ingredients shown in Table II were mixed together using a high speed impeller mixer for 5 minutes. The filler alloy powder is then added to the binder ingredients and the resulting combination is mixed and vacuum degassed in a double planetary mixer at 1 Torr absolute pressure for an additional 10 minutes.

TABLE II

| | % WGT |
|---|---|
| n-Butyl Methacrylate Polymer ($T_g$ = 15° C.) | 2.18 |
| Butyl Benzyl Phthalate | 1.56 |
| Dipropylene Glycol Methyl Ether Acetate | 2.92 |
| Octylphenoxypolyethoxyethanol Nonionic Surfactant | 0.14 |
| Filler Alloy Powder (−325 mesh) | 93.2 |

The resulting wide-gap putty had properties similar to those described above for the putty mixture of Example 1.

EXAMPLE 3

During an engine overhaul, a cobalt-based industrial gas turbine vane segment, with a composition as given in Table III, was inspected and found to contain numerous large cracks. The defects were of such size and location as to prevent them from being welded without the risk of creating additional cracks and distortions within the component. The cracks were also present in various horizontal, vertical and inverted orientations. The defects were first mechanically removed by grinding, leaving surface discontinuities to be repaired. The vane segment was cleaned for four hours at 1150° C. under a partial pressure of hydrogen. A two-part repair filler material comprised of two powdered alloys was prepared, with each part provided separately in the form of a moldable, adhesive putty. The first alloy powder (Part A) was a precipitation-strengthened nickel-base superalloy. The second alloy powder (Part B) was also a nickel-based powder with a melting range lower than the first alloy powder, due to the addition of boron as a melting point suppressant. The weight percent contents of the two alloy powder constituents are also given in Table III. Each of these two powders was mixed separately with the sacrificial binder ingredients to give putty compositions as defined in Table II.

Part A filler putty was manually positioned and shaped to fill each repair cavity. Part B putty was applied on top of the Part A putty deposit. The vane segment was dried in air for four hours at 75° C. and then for an additional four hours at 150° C. The article was transferred to a vacuum heat treating furnace which was evacuated to an absolute pressure of less than $1 \times 10^{-4}$ Torr. The temperature was initially raised to 250° C. over a period of about 30 minutes. Over the next 3 hours, the temperature of the furnace was raised to 450° C. while outgassing of the remaining binder ingredients occurred. Over the next 5 hours the temperature of the temperature of the furnace was raised to 1204° C. and held for 2 hours which resulted in liquid phase sintering of the repair filler material. The article was then cooled to room temperature to yield the final repaired part. The sintered repair filler material was completely bonded to the metal article and did not show signs of shrinkage, separation or flow, even in areas where the deposits were in inverted and vertical orientations. The small amount of positive material on the surface of the defects was then manually blended away to restore the original surface contour of each repair area.

TABLE III

| Element | Cobalt-Based Vane Alloy | Part A Filler Alloy (−325 Mesh) | Part B Braze Alloy (−325 Mesh) |
|---|---|---|---|
| Ni | 10.5 | Balance | Balance |
| Cr | 25.5 | 16.0 | 14.0 |
| Co | Balance | 8.5 | 10.0 |
| Al | | 3.5 | 3.5 |
| Ti | | 3.5 | |
| W | 7.5 | 2.6 | |
| Mo | | 1.75 | |
| Ta | | 1.75 | 2.5 |
| Nb | | 0.85 | |
| C | 0.25 | 0.10 | |
| B | 0.01 | 0.01 | 2.7 |
| Zr | | 0.06 | |
| Y | | | 0.06 |

EXAMPLE 4

The combination of sacrificial binder ingredients shown in Table IV are mixed together using a high speed impeller mixer for 5 minutes at 5000 rpm. A filler alloy powder is then added to the binder ingredients and mixed for an additional 10 minutes at 2500 rpm. The mixture is then transferred to shallow trays where the most volatile solvents (toluene and methyl ethyl ketone) are allowed to evaporate for 48 hours.

TABLE IV

| | % WGT |
|---|---|
| Methacrylate Polymer ($T_g$ = 5° C., supplied as 40% solids in toluene) | 3.25 |
| Ethyl Methacrylate Copolymer ($T_g$ = 40° C., supplied as 30% solids in methyl ethyl ketone) | 1.05 |
| Dipropylene Glycol Methyl Ether Acetate | 2.16 |
| Repair Filler Alloy Powder (−325 mesh) | 93.59 |

The resulting filler compound is in the form of a moldable, adhesive and self-supporting putty. This example demonstrates a sacrificial binder composition which excludes plasticizer and wetting agent. The low glass transition temperature of the Methacrylate Polymer (which, together with the Ethyl Methacrylate Copolymer, constitutes the principle binder resin) provides sufficient plasticity to make a moldable putty.

EXAMPLE 5

For comparison with the wide-gap filler material of the present invention, two wide-gap filler compositions were prepared which were comprised of alloy powders mixed with commercially available braze paste binders. The two commercial binders used for this purpose are well known and widely used by those skilled in the brazing art. They are considered to be typical of the two general classes of braze paste binders currently in use: (i) water-based gel binders containing polymers derived from natural cellulose and (ii) solvent-based binders containing synthetic organic polymers (thermoplastics). In the first comparative wide-gap filler, a nickel-based alloy powder, with a composition equivalent to that of the Part A Filler Powder in Table III, was mixed with a commercial braze paste binder known as "KAO" (Omni Technologies Corporation, Exeter, N.H.). This binder is a water-based gel containing cellulose ether (approximately 3%) as the principle binder resin and thickener. The KAO binder was added to the alloy powder incrementally to the point at which the mixture was no longer granular, but formed a stiff, cohesive paste; the total amount of KAO being in the range of 4–6 weight percent.

A second comparative wide gap filler material was prepared using the same alloy powder and another commercial braze paste binder known as Nicrobraz 500 Cement (Wall Colmonoy Corporation, Madison Heights, Mich.). This binder is comprised of a plastic (approximately 6 weight percent) dissolved in an organic solvent (1-1-1 Trichloroethane). A wide-gap filler putty containing this binder was prepared in the same way as for the KAO binder, using approximately 4–6% weight percent of the Nicrobraz 500 Cement.

For each of these two commercial braze paste binders, it is to be noted that the amounts of the principle binder resins, cellulose ether and plastic, are much lower (3 and 6 weight percent, respectively) than in the sacrificial binder of the present invention (25–50 weight percent), but as stated above, they are typical of those currently used in the art. In addition, the organic solvent used in the Nicrobraz 500 cement, 1-1-1 trichloroethane, has a much higher vapour pressure (approximately 125 mm Hg at 25° C.) than the solvents preferred for use in the sacrificial binder of the present invention.

These two comparative wide-gap filler materials were found to be inferior to the wide-gap filler material of the present invention for the following reasons:

1. They were both weak and did not have enough firmness or "body" to be easily molded by hand into free standing shapes. On the contrary, they each had a wet consistency and tended to pull appart easily during handling. It was suspected that this was due to the low levels of principle binder resin and high solvent levels in each of the commercial binders. This weakness also made each of the comparative wide-gap fillers prone to slumping and distortion during handling.
2. The comparative wide-gap filler materials would not adhere to vertical and inverted surfaces. Once again, the low levels of principle binder resin were thought to be responsible for the poor performance.
3. The comparative wide-gap filler materials each dried out too quickly. Their surfaces became hard and brittle after 10 to 15 minutes of exposure to air, making them prone to tearing and cracking when attempts were made to mold them into free-standing shapes after this period of time had elapsed. This deficiency was caused by the comparatively high vapour pressures and fast evapouration rates of the solvents used in the commercial braze paste binders.

EXAMPLE 6

A two-part, high-temperature hardfacing compound is formulated as follows using the sacrificial binder ingredients of Example 2 and nickel chromium-chromium carbide composite powders whose mesh sizes are both −325 mesh.

TABLE V

| | | % WGT |
|---|---|---|
| Part A | n-Butyl Methacrylate Polymer ($T_g$ = 15° C.) | 4.91 |
| | Butyl Benzyl Phthalate | 3.51 |
| | Dipropylene Glycol Methyl Ether Acetate | 6.56 |
| | Octylphenoxypolyethoxyethanol Nonionic Surfactant | 0.32 |
| | Metco 83VF-NS Composite Powder, −325 Mesh (50% chromium carbide clad with 50% nickel-chromium alloy) | 84.7 |
| Part B | n-Butyl Methacrylate Polymer ($T_g$ = 15° C.) | 2.18 |
| | Butyl Benzyl Phthalate | 1.56 |
| | Dipropylene Glycol Methyl Ether Acetate | 2.92 |
| | Octylphenoxypolyethoxyethanol Nonionic Surfactant | 0.14 |
| | Amdry XPT 476 Alloy Powder, −325 Mesh (Ni—15Cr—3.5B) | 93.2 |

Each Part is in the form of a moldable, adhesive and self-supporting putty. The Part A putty is applied to the Z-notch (contact surface) of a shrouded industrial turbine blade. The Part B putty is applied to the surface of the Part A putty to give an approximate weight ratio of 60:40, Part A:Part B.

The composite powder deposits are dried in air for four hours at 75° C. and then for an additional four hours at 150° C. The blade is transferred to a vacuum heat treating furnace which is evacuated to an absolute pressure of less than $1 \times 10^{-4}$ Torr. The temperature is initially raised to 250° C. over a period of about 30 minutes. Over the next 3 hours, the temperature of the furnace is raised to 450° C. while outgassing of the remaining binder ingredients occurred. Over the next 5 hours the temperature of the furnace is raised to 1176° C. and held for 30 minutes which results in liquid phase sintering of the composite wide-gap filler material. The article is then cooled to room temperature to yield the final repaired part. The bonded composite powder provides the interlocking Z-notch contact surfaces with enhanced wear resistance while the blades are operating in a gas turbine engine.

The present invention has been described in connection with specific examples and embodiments. However, it will be understood by those skilled in the art that the invention is capable of other variations and modifications without departing from its scope as represented by the appended claims. The above references are hereby incorporated by reference.

What is claimed is:

1. A wide-gap filler material for forming near-net-shape repairs or joints in a metallic substrate which, in its initial state, is in the form of an adhesive, self-supporting putty, capable of being molded under manual pressure to take the shape of the joint or repair cavity, and which will not thereafter flow, slump, or separate from the substrate under the force of its own weight during subsequent drying and heat treatment operations, consisting essentially of, by weight, 85–95% of a metallic or alloy powder, 5–15% of a sacrificial binder, wherein the sacrificial binder consists essentially of, by weight, 30–40% of a methacrylate polymer, ethyl methacrylate copolymer or a n-butyl methacrylate polymer, with a glass transition temperature below 20° C., 30–45% of either a glycol ether or glycol ether acetate solvent with a vapor pressure of less than 20 mm Hg at 20° C., 15–25% of a phthalic or adipic ester plasticizer and 1–2% of a nonyl phenol base or octyl phenol base nonionic surfactant.

2. The wide-gap filler material of claim 1, wherein the alloy powder or powders have as their basis ingredient iron, nickel or cobalt.

3. The wide-gap filler material of claim 1, wherein a two-part repair filler material is provided, the first part comprising a mixture of sacrificial binder and metallic or alloy powder having as its basis metal an element selected from the group consisting of nickel, cobalt or iron, the second part comprising a mixture of sacrificial binder and metallic or alloy powder having with as its basis metal an element selected from the group consisting of nickel, cobalt or iron, and containing a melting point depressant such as boron or silicon in a quantity substantially exceeding that present in the first part alloy powder or the substrate article, wherein separate putty components are supplied in a predetermined weight ratio.

4. The wide-gap filler material of claim 1, wherein the metallic or alloy powder and metallic or alloy substrate are selected from iron, nickel or cobalt-based superalloys and the powders have a particle size of −325 mesh.

* * * * *